(12) United States Patent
Narayanan

(10) Patent No.: US 7,346,771 B2
(45) Date of Patent: Mar. 18, 2008

(54) KEY DISTRIBUTION ACROSS NETWORKS

(75) Inventor: Ram Gopal Lakshmi Narayanan, Woburn, MA (US)

(73) Assignee: Nokia Corporation (FI)

( * ) Notice: Subject to any disclaimer, the term of this patent is extended or adjusted under 35 U.S.C. 154(b) by 607 days.

(21) Appl. No.: 10/292,484

(22) Filed: Nov. 13, 2002

(65) Prior Publication Data

US 2004/0091117 A1 May 13, 2004

(51) Int. Cl.
- H04K 9/00 (2006.01)
- H04Q 12/16 (2006.01)
- H04L 9/00 (2006.01)
- G06F 15/16 (2006.01)

(52) U.S. Cl. ............... 713/153; 370/216; 380/284; 709/225

(58) Field of Classification Search ........... 380/277, 380/284; 713/153; 370/216; 709/225
See application file for complete search history.

(56) References Cited

U.S. PATENT DOCUMENTS

| | | | |
|---|---|---|---|
| 5,539,824 A * | 7/1996 | Bjorklund et al. .......... 380/249 |
| 6,041,123 A | 3/2000 | Colvin, Sr. | |
| 6,240,188 B1 * | 5/2001 | Dondeti et al. ............ 380/284 |
| 6,240,514 B1 | 5/2001 | Inoue et al. | |
| 6,389,532 B1 * | 5/2002 | Gupta et al. ............... 713/163 |
| 6,643,706 B1 | 11/2003 | Marques et al. | |
| 6,751,729 B1 * | 6/2004 | Giniger et al. ............. 713/153 |
| 6,880,090 B1 * | 4/2005 | Shawcross .................. 726/14 |
| 6,954,790 B2 * | 10/2005 | Forslow ..................... 709/227 |
| 7,028,183 B2 * | 4/2006 | Simon et al. ............... 713/168 |
| 2002/0071430 A1 * | 6/2002 | Szyszko ...................... 370/389 |
| 2002/0118674 A1 * | 8/2002 | Faccin et al. .............. 370/352 |
| 2002/0131362 A1 * | 9/2002 | Callon ....................... 370/216 |
| 2002/0131602 A1 * | 9/2002 | Ishii ........................... 380/278 |
| 2002/0133602 A1 * | 9/2002 | Godwin et al. ............ 709/229 |
| 2002/0133608 A1 * | 9/2002 | Godwin et al. ............ 709/230 |
| 2002/0141343 A1 * | 10/2002 | Bays ........................... 370/235 |
| 2002/0147820 A1 * | 10/2002 | Yokote ....................... 709/229 |
| 2003/0018908 A1 * | 1/2003 | Mercer et al. ............. 713/193 |
| 2003/0091030 A1 * | 5/2003 | Yegin et al. ................ 370/352 |

(Continued)

OTHER PUBLICATIONS

Murphy, S.; Gudmundsson, O.; Mundy, R.; Wellington, B; DARPA Information Survivability Conference and Exposition, 2000. DISCEX ' 00. Proceedings vol. 1, Jan. 25-27, 2000 pp. 3-17 vol. 1 Digital Object Identifier 10.1109.*

(Continued)

Primary Examiner—Emmanuel L. Moise
Assistant Examiner—Techane J. Gergiso
(74) Attorney, Agent, or Firm—Banner & Witcoff

(57) ABSTRACT

Systems and methods are provided for managing and distributing keys between routers using protocol exchange messages between routers as key distribution vehicles. According to one embodiment of the invention, a router of an autonomous system uses its private key to send cryptographic information associated with another router to a peer router as part of its protocol exchange messages. The peer router is able to extract the cryptographic information and store it in a look-up table. Such protocol exchange messages may occur as part of an Interior Gateway Protocol or an Exterior Gateway Protocol. According to another embodiment of the invention, a chain authentication system is created as boundary routers of autonomous systems having a trust relationship share cryptographic information for other autonomous systems as part of protocol exchange messages for the exterior gateway protocol.

22 Claims, 4 Drawing Sheets

U.S. PATENT DOCUMENTS

2003/0142823 A1* 7/2003 Swander et al. ............ 380/277
2003/0235174 A1* 12/2003 Pichna et al. ............... 370/338
2004/0064725 A1* 4/2004 Padmanabhan et al. ..... 713/201

OTHER PUBLICATIONS

Ishii, Shuji (JP) Key distribution system for protection of route-update notifications in micromobility networks EP1244271.*

A Survey of Multicast Security Issues and Architectures. Peter S. Kruus ☐☐http://csrc.nist.gov/nissc/1998/proceedings/paperF10.pdf.*

Public-key infrastructure for the Secure Border Gateway Protocol (S-BGP) Seo, K.; Lynn, C.; Kent. S.; DARPA Information Survivability Conference & Exposition II, 2001. DISCEX '01. Proceedings.*

Murphy, S.; Gudmundsson, O.; Mundy, R.; Wellington, B.; DARPA Information Survivability Conference and Exposition, 2000. DISCEX ' 00. Proceedings vol. 1, Jan. 25-27, 2000 pp. 3-17 vol. 1 Digital Object Identifier 10.1109/DISCEX.2000.824937.*

Stephen Kent, Charles Lynn, and Karen Seo (Secure Border Gateway Protocol (S-BGP) IEEE Journal on Selected Areas in Communications, vol. 18, No. 4, Apr. 2000).*

Moskowitz, "The Host Identity Payload Homepage" (http://homebase.htt-consult.com/HIP.html, printed Feb. 11, 2003), HIP Presentation for Federal Meeting, May 2001.

"General Requirements For Context Transfer" (http://www.ietf.org/internet-drafts/draft-ietf-seamoby-ct-reqs-05.txt, printed Feb. 11, 2003), Internet Engineering Task Force, Gary Kenward, Editor, Oct. 2002, pp. 1-10.

"IP Security Protocol (ipsec)" (http://www.ietf.org/html.charters.ipsec-charter.html, printed Feb. 11, 2003), Last Modified Jan. 2003, pp. 1-4.

Kent et al., "Security Architecture For The Internet Protocol" (http://www.ietf.org/rfc/rfc2401.txt, printed Feb. 13, 2002), Nov. 1998, pp. 1-62.

Maughan et al., "Internet Security Association And Key Management Protocol (ISAKMP)" (http://www.ietf.org/rfc/rfc2408.txt, printed Feb. 11, 2003), Nov. 1998, pp. 1-81.

Schneier, "Applied Cryptography", 1996, John Wiley & Sons, Inc., Second Edition, pp. 185-187.

Harkins et al., "The Internet Key Exchange (IKE)", (http://www/ieft.org/rfc.rfc2409.txt, printed Feb. 11, 2003), Nov. 1998, pp. 1-39.

Huitema, "Routing In the Internet", Second Edition, Prentice Hall PTR, 2000, entire volume.

* cited by examiner

KEY DISTRIBUTION ACROSS NETWORKS

FIELD OF THE INVENTION

This invention relates generally to telecommunications networks. More particularly, the invention concerns systems and methods for distributing cryptographic keys across networks.

BACKGROUND OF THE INVENTION

Network routers typically forward data packets based on the destination address of the packet. Routers determine the next hop for forwarding each packet based on routing look-up tables determined by routing protocols. Routers controlled by the same administrative authority are part of an autonomous system (AS) and thereby share common routing strategies, policies and protocols. Interior Gateway Protocols (IGPs) are routing protocols used within an AS to provide local routing information to local routers. This information is communicated in various messages between routers and is used to update the look-up tables. Examples of IGPs include Routing Information Protocols (RIP), the Open Shortest Path First protocol (OSPF), and Intermediate System-to-Intermediate System Routing Protocol (IS-IS).

Exterior Gateway Protocols (EGP) are routing protocols that are used for exchanging information about routes between AS's and boundary routers. One type of EGP is the protocol commonly found on the backbone of the Internet known as the Border Gateway Protocol (BGP). Boundary routers using BGP typically communicate with other routers using UPDATE messages. BGP uses the TCP/IP protocol for communications between routers and includes a number of security features for these communications. For example, it includes incorporating digital signatures for communications between boundary routers.

Conventional systems for using these security features are often inefficient, which can discourage their widespread use. For example, in the context of a Public Key Infrastructure (PKI), secure routing using PKI may involve repeated communications with trusted third parties for key transfer or require multiple encryption/decryption steps. These additional steps are generally inefficient for high speed routing within the Internet. Another example is use of the Host Identity Protocol (HIP). As with PKI, HIP has not been put into widespread practice for Internet routing due to associated changes required in the Internet infrastructure.

Other conventional mechanisms for providing security features in the Internet include the Internet Engineering Task Force (IETF) Internet Key Exchange (IKE) protocol and the Internet Protocol Security protocol (IPSec). IPSec permits two endpoints to negotiate and establish a security association (SA) between each other to permit secure transmissions, such as via tunneling. The deployment and adoption of IPSec, however, is slow and requires lots of processing elements. Further, with IPSec, users cannot validate certificates and they are not sure whether they are communicating with the actual desired endpoint. IKE is used in conjunction with IPSec for key establishment and management; however, it is complicated and has numerous options that make it difficult to use for normal operation.

Without such systems, however, security vulnerabilities for packets traveling through the Internet are frequently exploited. For example, denial of service attacks, worms, and viruses exploit various weaknesses in the Internet infrastructure. Thus, a need exists for efficient mechanisms for managing and distributing keys among network components using existing infrastructure.

SUMMARY OF THE INVENTION

In order to overcome the above-described problems and other problems that will become apparent when reading this specification, the present invention provides efficient systems and methods for managing and distributing keys between routers and other network components using existing Internet infrastructure. In particular, systems and methods of the present invention may use protocol exchange messages between routers as a vehicle to securely distribute and manage public keys or certificates between AS's and within AS's. Such methods provide efficient, secure, and scalable systems for distributing keys among peers that do not require significant changes to the Internet infrastructure. Further, such methods and systems avoid common security problems, such as key revocation difficulties.

According to one embodiment of the invention, a router of an autonomous system uses its private key to send cryptographic information associated with another router to a peer router as part of its protocol exchange messages. The peer router is able to extract the cryptographic information and store it in a look-up table. Such protocol exchange messages may occur in accordance with an IGP or an EGP. According to another embodiment of the invention, a secure communication system referred to herein as a "chain authentication system" is created as boundary routers of a first set of AS's having an established trust relationship share with each other, using protocol exchange messages, security information they each have for communicating with other AS's. Thus, the secure communication system grows beyond the first set of AS's in a chained fashion.

In other embodiments of the invention, computer-executable instructions for implementing the disclosed methods are stored on computer-readable media. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE INVENTION

Figure 1:
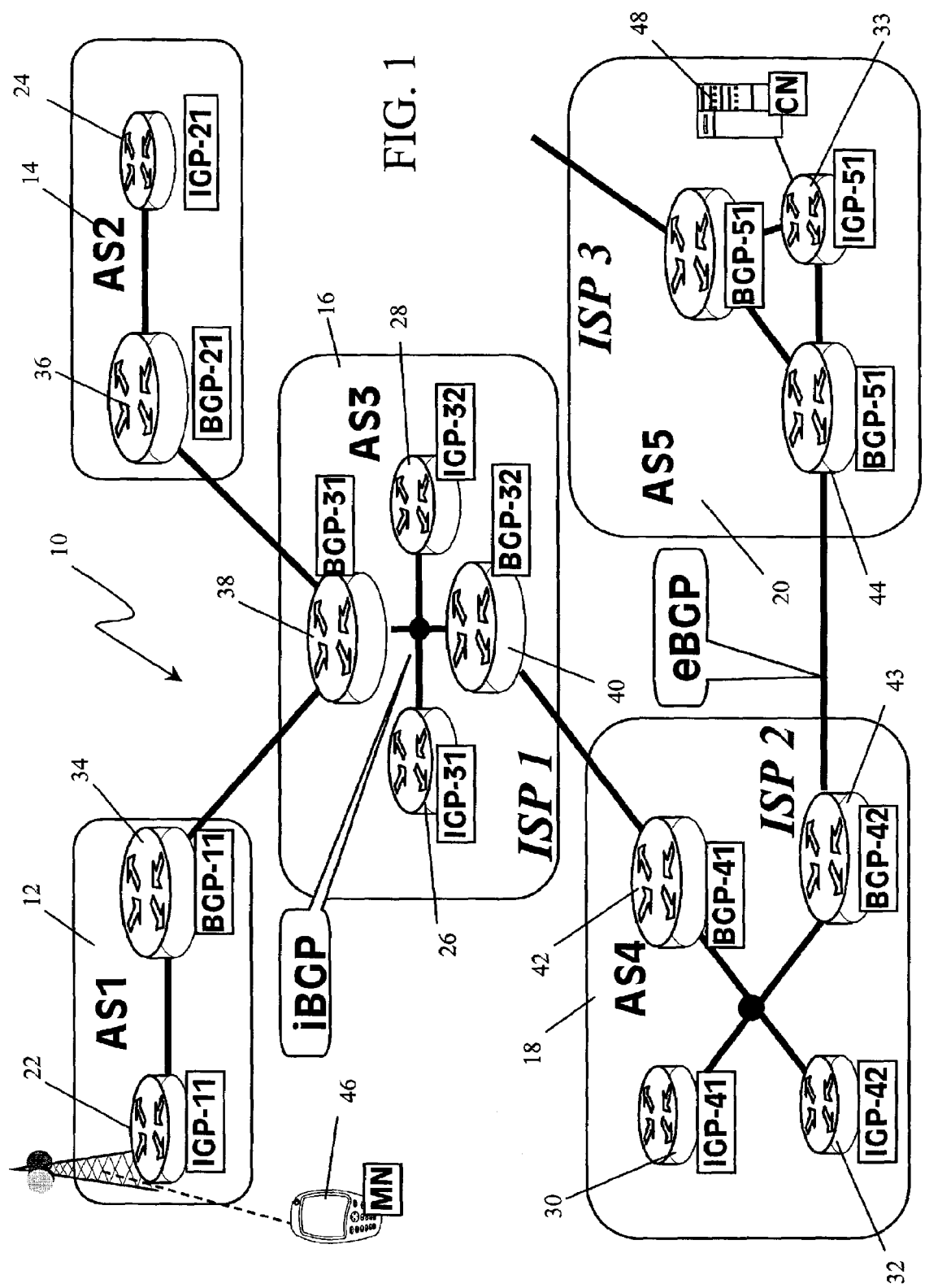
FIG. 1 shows an architecture that supports systems and methods for secure transmissions according to embodiments of the invention.

The invention may be embodied in various forms. Referring now to FIG. 1, an example network architecture 10 is shown that supports systems and methods in accordance with embodiments of the invention. The architecture generally includes interconnected autonomous systems AS1 12, AS2 14, AS3 16, AS4 18 and AS5 20. Autonomous systems (AS's) as used herein generally refer to a group of routers controlled by the same administrative authority and that share common routing strategies and protocols. Architecture 10 is a simple example architecture that does not differentiate between hosts and routers, packet switches and terminals, subnets and links, etc. Each router is identified by its address, which is simply represented here as IGP-xx or BGP-xx. In the present example, links are symmetric; however, they are not required to be symmetric.

As shown, AS1 and AS2 are stub AS's (i.e. connected to only one other AS), and AS3, AS4 and AS5 are transit AS's (connected to more than one AS and may be used as a conduit for traffic between other AS's). Further, AS3 is operated by Internet Service Provider (ISP) 1, AS4 is operated by ISP 2, and AS5 is operated by ISP 3. Each AS runs its own Interior Gateway Protocol (IGP) between its interior routers. Interior routers within each AS run only their IGP, and boundary routers, which also communicate with external routers, run an Exterior Gateway Protocol (EGP) along with the IGP for their AS. For example, the following routers run only the respective IGP for their AS: IGP-11 22, IGP-21 24, IGP-31 26, IGP-32 28, IGP-41 30, IGP-42 32 and IGP-51 33. The following boundary routers run both the respective IGP for their AS and the appropriate EGP: BGP-11 34, BGP-21 36, BGP-31 38, BGP-32 40, BGP-41 42, BGP-42 43 and BGP-51 44. The boundary routers cooperate with their neighboring peers via the EGP and cooperate with routers within the same AS via their IGP.

In general, routing protocols allow a router to gain information about routes and other routers. They do this by exchanging messages with other routers and updating their routing lookup tables based on information received in the messages and based on various algorithms. Examples of IGPs include the Routing Information Protocol (RIP), the Open Shortest Path First protocol (OSPF), and Intermediate System-to-Intermediate System Routing Protocol (IS-IS). One type of EGP is the protocol commonly found on the backbone of the Internet known as the Border Gateway Protocol (BGP). BGP uses the TCP/IP protocol for communications between routers and includes a number of security features for these communications. For example, it may incorporate digital signatures for communications between boundary routers. A version of BGP known as iBGP may be used for exchanging BGP information within a transit AS, such as AS3, to each of the boundary routers within the AS (e.g. BGP-31 and BGP-32). Hence, a packet arriving at BGP-31 destined for AS5 may be transmitted across the network to boundary router BGP-32 using iBGP tables, metrics and policies.

AS1, AS2 and AS 4 of architecture 10 have a peering relationship with AS3. As such, the boundary routers of AS1, AS2 and AS4 may send protocol exchange messages to respective boundary routers of AS3 that include routing information. Similarly, routers within the same AS also have peering relationships with each other and exchange messages that include intra-AS routing information. For example, AS1 boundary router BGP-11 sends and receives protocol exchange messages, such as BGP UPDATE messages, to and from BGP-31. Also, IGP-11 broadcasts protocol exchange messages to BGP-11.

According to one embodiment of the invention, protocol exchange messages may act as vehicles for managing cryptographic information, such as certificates and keys, for respective AS's. For example, using an asymmetric public-key cryptography scheme, public keys for routers of particular AS's may be securely transferred using protocol exchange messages. Thus, each AS may learn about public keys for other AS's via trusted communications occurring as part of the protocol exchange messages. As the public key information is shared among trusted AS's, a secure authentication and communication system is expanded in a chain-like fashion. Thus, a chained authentication system is created through which packets may be securely and efficiently routed. The extent of the chained authentication system (e.g. number of AS's involved) may be limited according to policies established between the AS's (e.g. as part of service level agreements).

A chained authentication system according to the present invention may provide many benefits. It can take advantage of existing routing infrastructures to securely distribute public keys among trusted AS's. Due to self-stabilization properties inherent in routing protocols (e.g. frequent periodic updates), key revocation is minimized as a problem with such a system. For example, routers repeatedly update each other with regard to routing information such as the state of links, routes and other routers using protocol exchange messages. If a link becomes unavailable, that information is quickly communicated to other routers. Likewise, if a key is revoked, such information may be quickly communicated to routers of a chained authentication system using protocol exchange messages.

As a further benefit, such a system avoids reliance on external certificate authorities (CAs), which act as repositories of keys, and inefficiencies and security issues that may be related therewith. Methods for establishing a chained authentication system and aspects thereof according to the invention are discussed below with regard to FIG. 4. Once established, packets may be routed through a path including the chained authentication system, for example, from AS1 to AS5 (via AS3 and AS4), in a secure and efficient manner.

As a general example illustrating secure transmissions through such a system, suppose that IGP-11 in AS1 is a home agent routing messages to and from a mobile node (MN) 46. Suppose also that a correspondent node (CN) 48 contains content being received by MN 46 and that router IGP-51 is forwarding messages to and from CN 48. Suppose further that MN 46 needs to register a care-of-address with CN 48 as part of a handover procedure known in the art of mobile communication devices. As such, a Binding Update (BU) message is generated at MN 46 and sent to CN 48. BGP-11 intercepts the BU message before it leaves AS1 and authenticates it. BGP-11 then forwards it to AS5 via AS3 and AS4. AS5 can use the public key of AS1 as provided through the chained authentication system of the present invention and thereby validate the source of the message.

Figure 2:
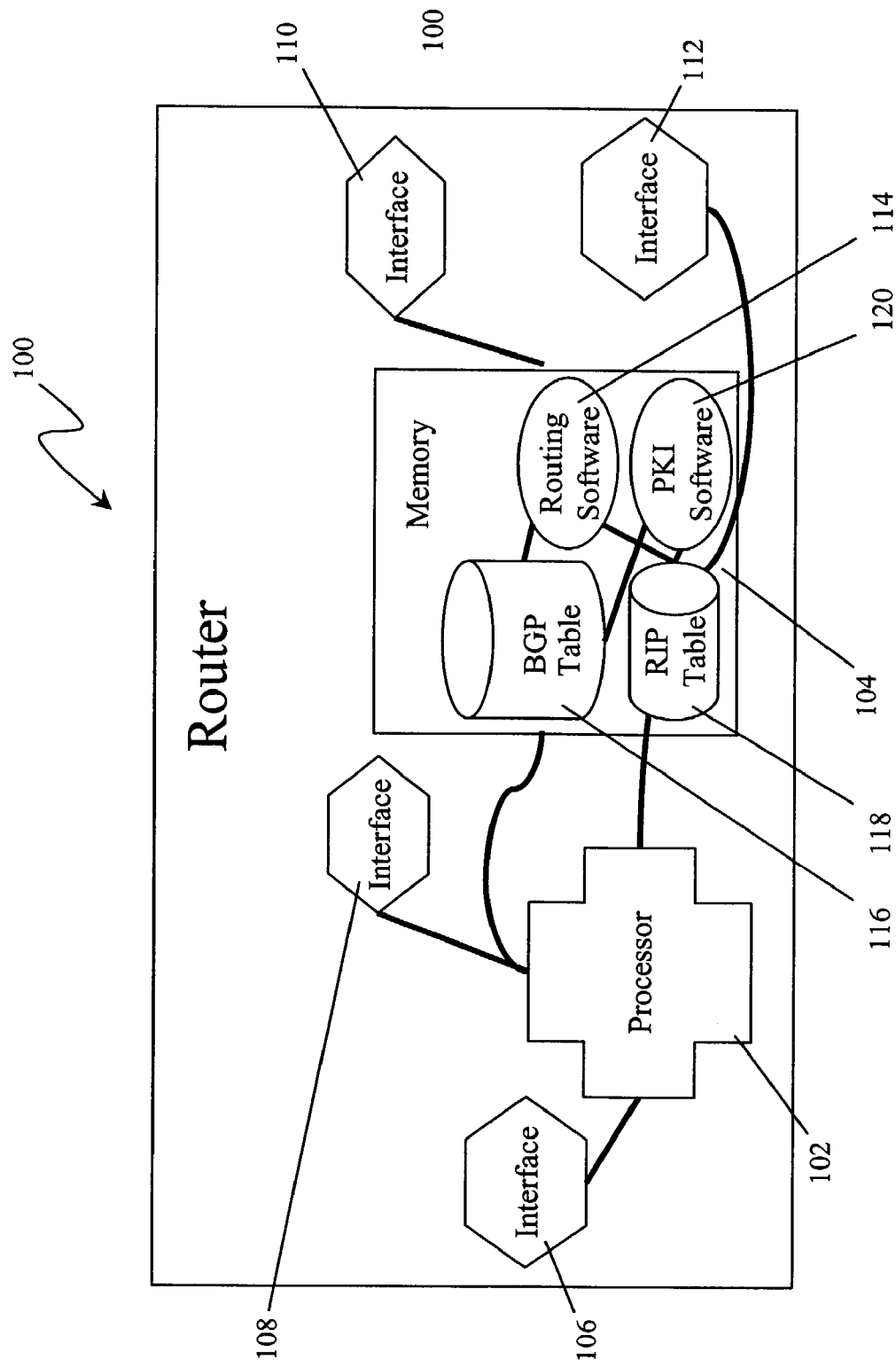
FIG. 2 shows a sample router of the system of FIG. 1.

Referring now to FIG. 2, an example router 100 according to one embodiment of the invention is shown. The router 100 generally includes a processor 102 connected to memory 104 and a plurality of communication interfaces 106, 108, 110 and 112. Stored in the memory 104 of router 100 is routing software 114, routing look-up tables 116, 118, and public Key Infrastructure (PKI) software 120. Routing software 114 includes programs written in a computer language, such as the language known as C, for making routing decisions and forwarding packets. PKI software 120 includes programs for encrypting and decrypting messages using public/private keys. In one embodiment router 100 operates on a UNIX® operating system, such as systems known as Berkeley System Distribution UNIX (BSD), Free BSD, or embedded real time operating system.

Figure 3:
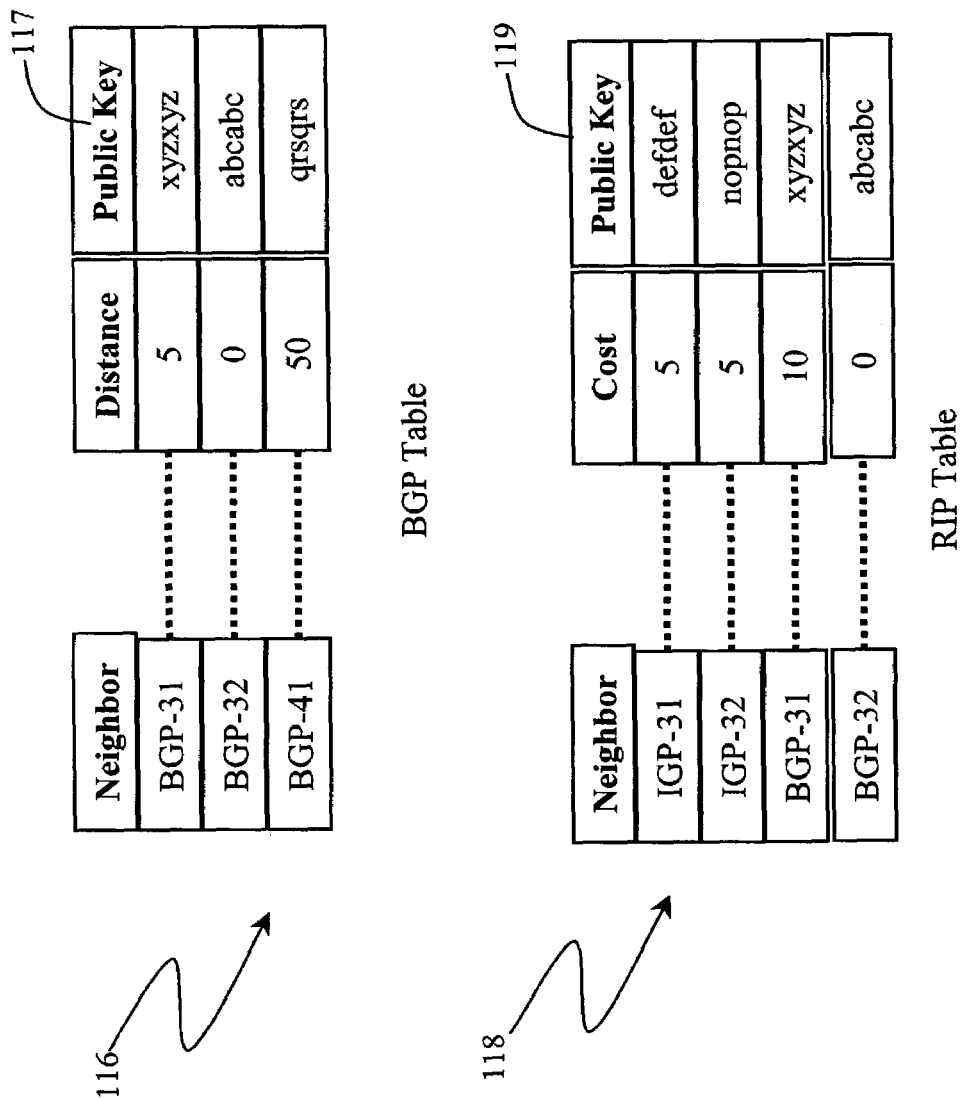
FIG. 3 shows sample routing look-up tables for the router of FIG. 2.

Referring now to FIG. 3, sample routing look-up tables 116, 118 are shown for router 100. Suppose that router 100 represents router BGP-32. As such, router 100 maintains a routing table 116 containing path reach-ability information (e.g. link states, costs, path vectors, etc.) related to border router BGP-41 that is updated according to the BGP. Additionally, router 100 maintains a routing table 118 containing path reach-ability information related to routers within AS3 that is updated according to an IGP such as RIP. Although shown as logically separate tables, a single table or database may alternatively be maintained containing relevant routing information. Entries within tables 116, 118 generally include path reach-ability information associated with other routers that are identified by the address of the particular router.

According to one embodiment of the invention, public key information is also maintained in tables 116, 118 for each router. For example, a public key 117, 119 associated with each router is stored in tables 116, 118. Although shown here as public key information, other security information such as secret-keys (used with symmetric cryptography), certificate information and authentication information may be stored in the tables 116, 118. Embodiments of the present invention discussed herein generally include the use of asymmetric public-key cryptography (i.e. public/private key cryptography); however, it is understood that the present invention is applicable to other secure communications mechanisms, such as symmetric key cryptography.

Figure 4:
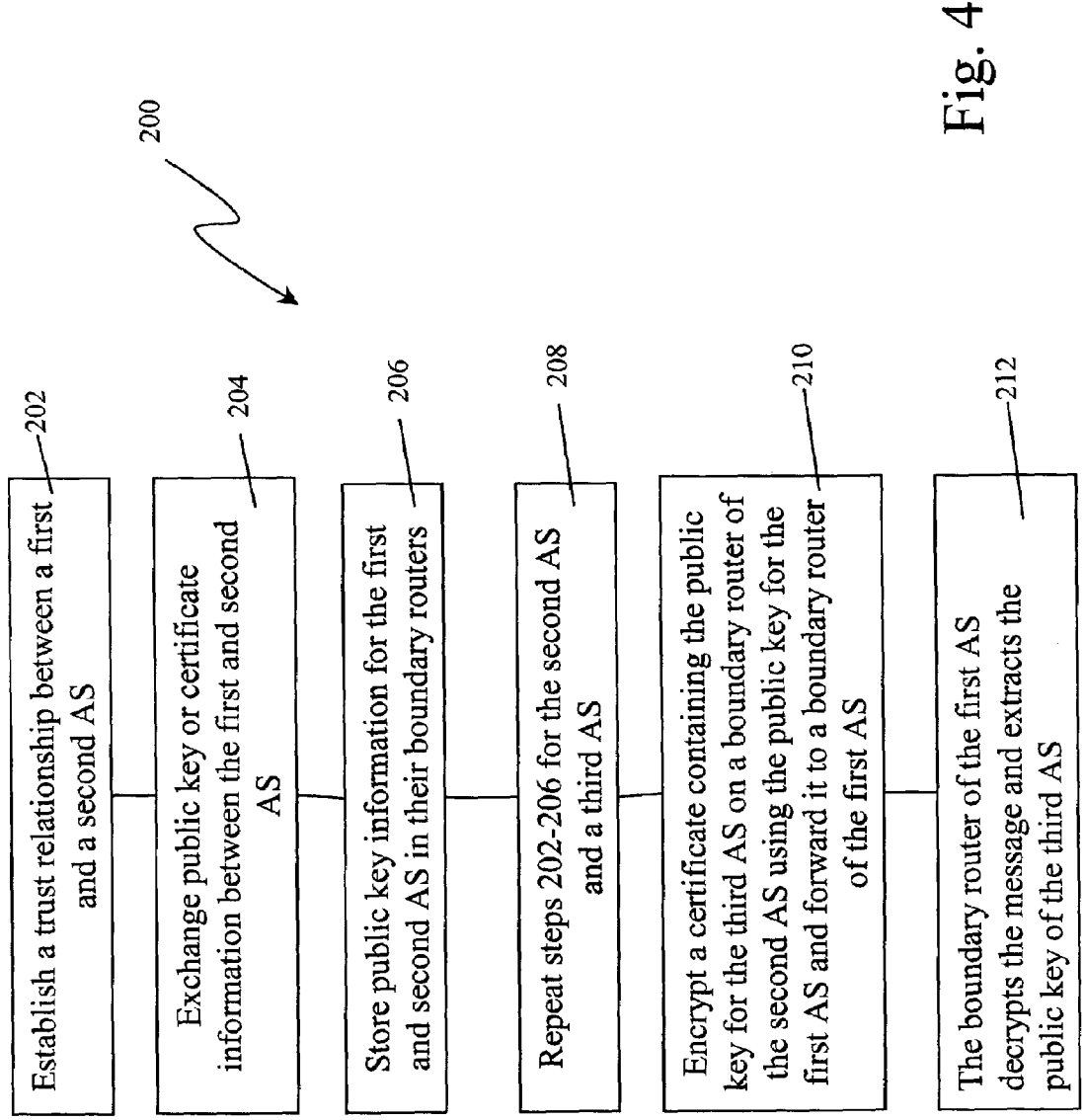
FIG. 4 shows steps in a method of creating a chained authentication system using the architecture of FIG. 1 according to an embodiment of the invention.

Referring now to FIG. 4 along with FIG. 1, a method 200 for creating a chained authentication system according to an embodiment of the invention is shown. Initially, a trust relationship is established 202 between a pair of adjacent AS's, such as a peering relationship between two Internet Service Providers (ISPs). Peering between ISPs generally refers to a relationship between adjacent ISPs where the ISPs have a service level agreement (SLA) in which they agree to peer with each other at certain locations (routers/AS's) and to exchange routing table information there between. A SLA may include information such as cost, traffic characteristics, and peering point(s) in the case of multi-homing (i.e. multiple connections to the Internet).

Suppose as an example that ISP 1 operating AS3 and ISP 2 operating AS4 have entered into an SLA. As part of the agreement, they exchange 204 their public keys (or certificates) with each other. Such public key transfer could be, for example, via a manual transfer of the public keys on paper, on a CD-ROM or floppy disk, or via digital transfer from a third party such as a certificate authority storing the public key information in the form of a certificate. In any event, the ISP's establish trust relationships between two transit AS's, such as AS3 and AS4, and exchange cryptographic information, such as public keys. The cryptographic information may be added to the look-up tables of boundary routers in various ways, such as via manual entry, reading the cryptographic information from a computer-readable medium such as a CD-ROM, or transferred electronically.

The public key information for each AS of the SLA is stored 206 in each boundary router BGP-31, BGP-32, BGP-41 and BGP-42. For example, routing tables 116, 118 in router 100 include public key information for router 100 (e.g. BGP-32), for routers within the same AS (e.g. IGP-31, IGP-32 and BGP-31), and for neighboring external routers (e.g. BGP-41). When boundary routers BGP-32 and BGP-41 are started, they begin exchanging protocol information as peers based on this information stored in their respective routing tables 116, 118.

Suppose that ISP2 and ISP3 also enter a SLA agreement in which they exchange public keys for their respective AS's, AS4 and AS5. As such, they have a peering agreement and are able to maintain secure communications. With peering agreements and public key exchange between AS3 and AS4, as well as between AS4 and AS5, messages may securely travel between AS3 and AS5 via AS4. However, multiple encryption/de-encryption steps would be required because routers in AS5 do not have the public keys of routers in AS3. With a chained authentication system that includes AS3, AS4 and AS5, messages may securely travel between AS5 and AS3 via AS4 without multiple encryption/de-encryption steps.

To set-up such a system, AS4 configures 208 its boundary routers, BGP-41 and BGP-42, with the public key for AS5. As part of protocol exchange messages between BGP-41 and BGP-32, BGP-41 encrypts 210 AS5's certificate containing its public key (or the public key itself) using AS3's public key and forwards it to BGP-32 of AS3. AS3 then decrypts 212 this message and extracts the public key for AS5.

As AS1 and AS2 have peering relationships with AS3, the process of exchanging public key information occurs repeatedly as part of encrypted protocol exchange messages. Eventually, AS1, AS2, AS3, AS4 and AS5 will each have stored within their boundary routers the public keys for each of the other AS's. As such, a chained authentication system is created, in which, for example, MN 46 and CN 48 may securely communicate without encryption and decryption steps occurring between each AS or without requesting certificates from external certificate authorities. Further, each AS may notify its neighbor of changes to its public key(s), and the neighbor can update its neighbor as part of protocol exchange messages. Thus, the problem of key revocation is minimized.

One of skill in the art recognizes that public keys and certificates may be populated within a particular AS in various ways. For example, a hash function may be used to authenticate the transfer this information within a particular AS. The hash function algorithm known as MD-5 may be used with IGPs like OSPF, RIP and IS-IS. In an alternative embodiment, the authentication mechanism known as SHA1 may be used.

For routers that do not have SHA1 implementation, SHA1 may be used for intra-AS key exchanges with the bits for SHA1 being truncated and fed as a key using MD5, because SHA1 uses a 160-bit message authentication code (MAC) and MD5 produces a 128-bit output.

In other embodiments within particular AS's, a policy server (not shown) may exist within each AS that acts as a local certificate authority. When a particular boundary router is started up, it can request updated certificate information from the policy server (not shown). Alternatively, other boundary routers may act as a certificate authority to update necessary certificate information for the AS.

The use of interior keys for communications within each AS, combined with secure communications between AS's via the chained authentication system, provides an overall secure infrastructure. If desired, public keys for network elements within each AS may be kept hidden and only the public key for the AS, or for a respective boundary router, may be broadcast. For example, with regard to communications between MN 46 and CN 48, IGP-11 may encrypt the binding update (BU) message from MN 46 using its private key and send it to BGP-1. BGP-11 may decrypt it using IGP-11's public key and then encrypt it using AS1's private key or AS1 can perform proxy authentication. When it arrives at AS5, BGP-51 may decrypt it using the public key for AS1, and then encrypt it for transmission to IGP-51.

Using such a key distribution system, signaling traffic generated between any two nodes on the Internet may be authenticated. As such, the path of a packet may be verified using public keys for AS's in the path. For instance, when a packet travels from one AS to another AS, the signaling traffic, such as binding updates, can be signed off at each AS border router with its private key. When the packet reaches the destination AS (e.g. AS5), it can recursively check the public keys of each AS in the packet to ensure the path. Accordingly, only public keys for each AS need to be shared in BGP protocol exchange messages. Yet, the combination of internal AS and external AS encryption mechanisms provides efficient communications with a high level of security.

While the present invention has been described in connection with the illustrated embodiments, it will be appreciated and understood that modifications may be made without departing from the true spirit and scope of the invention. In particular, the invention applies to almost any type of network and to a variety of different routing protocols and cryptography systems.

I claim:

1. A method comprising:
    establishing a portion of a chained authentication system at a second router located in a second autonomous system, the chained authentication system including the second autonomous system and a first and a third autonomous system, each of the first, second and third autonomous systems having a trust relationship with at least one of the other autonomous systems of the chained authentication system and each autonomous system sharing cryptographic information related to its trust relationships with the at least one of the other trusted autonomous systems, establishing a portion of the chained authentication system comprising:
        at the second router, receiving third cryptographic information for securely communicating with a third router located in the third autonomous system;
        receiving at the second router first cryptographic information for securely communicating with a first router located in the first autonomous system; and
        after receiving the first and third cryptographic information at the second router, sending a first routing protocol exchange message to the first router comprising the third cryptographic information for the third router, the first routing protocol exchange message including routing information for updating a routing look-up table corresponding to the first router.

2. The method of claim 1, further comprising:
    encrypting at the second router a third key associated with the third router, the encrypting being performed using a first key associated with the first router;
    wherein, for sending a first routing protocol exchange message to the first router, the third cryptographic information for the third router includes the encrypted third key.

3. The method of claim 2, wherein the encrypting at the second router comprises digitally signing a certificate comprising the third key using the first key.

4. The method of claim 2, further comprising extracting the third key from a look-up table corresponding to the second router.

5. The method of claim 4, further comprising:
    receiving from the first router a third protocol exchange message comprising a fourth key encrypted using a second key associated with the second router, the fourth key being associated with a fourth network entity;
    extracting the fourth key from the third protocol exchange message; and
    storing the fourth key in the look-up table.

6. The method of claim 2, wherein sending a first routing protocol exchange message to the first router occurs as part of operations in accordance with an Exterior Gateway Protocol.

7. The method of claim 6, wherein the Exterior Gateway Protocol comprises the Border Gateway Protocol.

8. The method of claim 1, further comprising, after receiving the first and third cryptographic information at the second router, sending a second routing protocol exchange message to the third router comprising the first cryptographic information for the first router, the second routing protocol exchange message including routing information for updating a routing look-up table corresponding to the third router.

9. The method of claim 1, wherein for receiving third cryptographic information for securely communicating with the third router, the third cryptographic information comprises a public key associated with the third router, and for receiving at the second router first cryptographic information for securely communicating with a first router, the first cryptographic information comprises a public key associated with the first router.

10. The method of claim 1, wherein sending a first routing protocol exchange message to the first router further comprises encrypting the third cryptographic information for the third router using a private key associated with the first router.

11. The method of claim 1, further comprising storing the received first and third cryptographic information in a look-up table corresponding to the second router.

12. The method of claim 1, wherein receiving the first and third cryptographic information for securely communicating with the first and the third routers each comprises reading the respective cryptographic information from a computer-readable medium.

13. The method of claim 1, wherein receiving the first and third cryptographic information for securely communicating with the first and the third routers each comprises:
    requesting the respective cryptographic information from a certificate authority; and
    receiving the respective cryptographic information from the certificate authority.

14. The method of claim 1, wherein receiving the first and third cryptographic information for securely communicating with the first and the third router occurs as part of operations in accordance with the interior Border Gateway Protocol.

15. An apparatus comprising:
    a second router, the second router comprising:
        a communications interface; and
        a processor configured to perform a method of establishing a portion of a chained authentication system at the second router when located in a second autonomous system, the chained authentication system including the second autonomous system and a first and a third autonomous system, each of the first, second and third autonomous systems having a trust relationship with at least one of the other autonomous systems of the chained authentication system and each autonomous system sharing cryptographic information related to its trust relationships with the at least one of the other trusted autonomous systems, establishing a portion of the chained authentication system comprising:
            receiving third cryptographic information for securely communicating with a third router located in the third autonomous system;

receiving first cryptographic information for securely communicating with a first router located in the first autonomous system; and after receiving the first and third cryptographic information:

encrypting a third key associated with the third router using a first key associated with the first router; and sending a first routing protocol exchange message to the first router comprising the third cryptographic information for the third router, the first routing protocol exchange message including routing information for updating a routing look-up table corresponding to the first router, the third cryptographic information including the encrypted third key.

16. The apparatus of claim 15, wherein the processor is configured to perform the method further comprising:

receiving from the first router a third protocol exchange message comprising a fourth key encrypted using a second key associated with the second router, the fourth key being associated with a fourth network entity;

extracting the fourth key from the third protocol exchange message; and storing the fourth key in a look-up table stored in the memory.

17. The apparatus of claim 15, wherein encrypting a third key associated with the third router comprises digitally signing a certificate comprising the third key using the first key.

18. The apparatus of claim 15, wherein the processor is configured to perform the method further comprising extracting the third key from a look-up table stored in the memory.

19. A computer-readable medium storing computer readable instructions configured to perform a method on a second router, the method comprising:

establishing a portion of a chained authentication system at the second router located in a second autonomous system, the chained authentication system including the second autonomous system and a first and a third autonomous system, each of the first, second and third autonomous systems having a trust relationship with at least one of the other autonomous systems of the chained authentication system and each autonomous system sharing cryptographic information related to its trust relationships with the at least one of the other trusted autonomous systems, establishing a portion of the chained authentication system comprising:

receiving third cryptographic information for securely communicating with a third router located in the third autonomous system;

receiving first cryptographic information for securely communicating with a first router located in the first autonomous system; and after receiving the first and third cryptographic information:

encrypting a third key associated with the third router using a first key associated with the first router; and sending a first routing protocol exchange message to the first router comprising the third cryptographic information for the third router, the first routing protocol exchange message including routing information for updating a routing look-up table corresponding to the first router, the third cryptographic information including the encrypted third key.

20. The computer-readable medium of claim 19, wherein the method further comprises:

receiving from the first router a third protocol exchange message comprising a fourth key encrypted using a second key associated with the second router, the fourth key being associated with a fourth network entity;

extracting the fourth key from the third protocol exchange message; and storing the fourth key in a look-up table stored in the memory.

21. The computer-readable medium of claim 19, wherein encrypting the third key associated with the third router comprises digitally signing a certificate comprising the third key using the first key.

22. The computer-readable medium of claim 19, the computer-readable instructions for the method further comprising extracting the third key from a look-up table stored in the memory.

* * * * *